United States Patent [19]

Béchet

[11] Patent Number: 4,800,240
[45] Date of Patent: Jan. 24, 1989

[54] DEVICE FOR DETECTING THE DISPLACEMENT OF A WRITING IMPLEMENT

[75] Inventor: Louis Béchet, Douvaine, France

[73] Assignee: Battelle Memorial Institute, Switzerland

[21] Appl. No.: 57,059

[22] PCT Filed: Sep. 9, 1986

[86] PCT No.: PCT/CH86/00127
  § 371 Date: May 7, 1987
  § 102(e) Date: May 7, 1987

[87] PCT Pub. No.: WO87/01842
  PCT Pub. Date: Mar. 26, 1987

[30] Foreign Application Priority Data

Sep. 11, 1985 [CH] Switzerland ............ 3925/85

[51] Int. Cl.⁴ ............................................. G08C 21/00
[52] U.S. Cl. .......................................... 178/18; 382/3
[58] Field of Search ............... 178/18, 19, 20; 382/13, 382/3, 64; 324/228, 174, 179, 208; 73/506, 514, 519

[56] References Cited

U.S. PATENT DOCUMENTS

3,647,963  3/1972  Bailey .................................... 178/19

FOREIGN PATENT DOCUMENTS

0029664  6/1981  European Pat. Off. .
2155878  5/1973  France .

OTHER PUBLICATIONS

IBM Technical Disclosure Bulletin, vol. 3, No. 6, Nov. 1960, (New York, US), K. A. Ahmad: "Signal Communication Apparatus", p. 22, See the Whole Document.
IBM Technical Disclosure Bulletin, vol. 22, No. 3, Aug. 1979, (New York, US), P. E. Stuckert: "Magnetic Pen and Tablet", pp. 1245-1251, See the Whole Document.
Abstracts of IECE Transactions, vol. 58, No. 5, N. Aoki et al.: "Data Tablet for Handwriting Characters", pp. 51-52, See Pages 51-52.
WO, A 80/02883 (Battelle Memorial Institute), Dec. 24, 1980, See p. 2, Line 21-p. 3, Line 13; FIGS.; p. 3, Line 23-p. 6, Line 27.
WO, A 79/00363, (Battelle Memorial Institute), Jun. 28, 1979, See the Whole Document, (Cited in the Application).

Primary Examiner—Stafford D. Schreyer
Attorney, Agent, or Firm—Cushman, Darby & Cushman

[57] ABSTRACT

The disclosed device comprises electric conductors (1, 1'; 2') arranged under the writing surface and associated to a writing implement provided with a permanent magnet of which the power supply is orientated in parallel to its longitudinal axis. Said conductors form elongated meandres-like windings covering the writing surface so that when the implement is displaced in parallel to said surface and tranversely to the meandres of the windings, a sinusoidal voltage is induced at the terminals of the windings provided the instrument is close enough to the writing surface. The pitch of the meandres of the windings is so elected as to induce a sinusoidal voltage having an amplitude higher than a given threshold for a predetermined interval between the writing implement and the writing surface.

3 Claims, 1 Drawing Sheet

U.S. Patent  Jan. 24, 1989  4,800,240
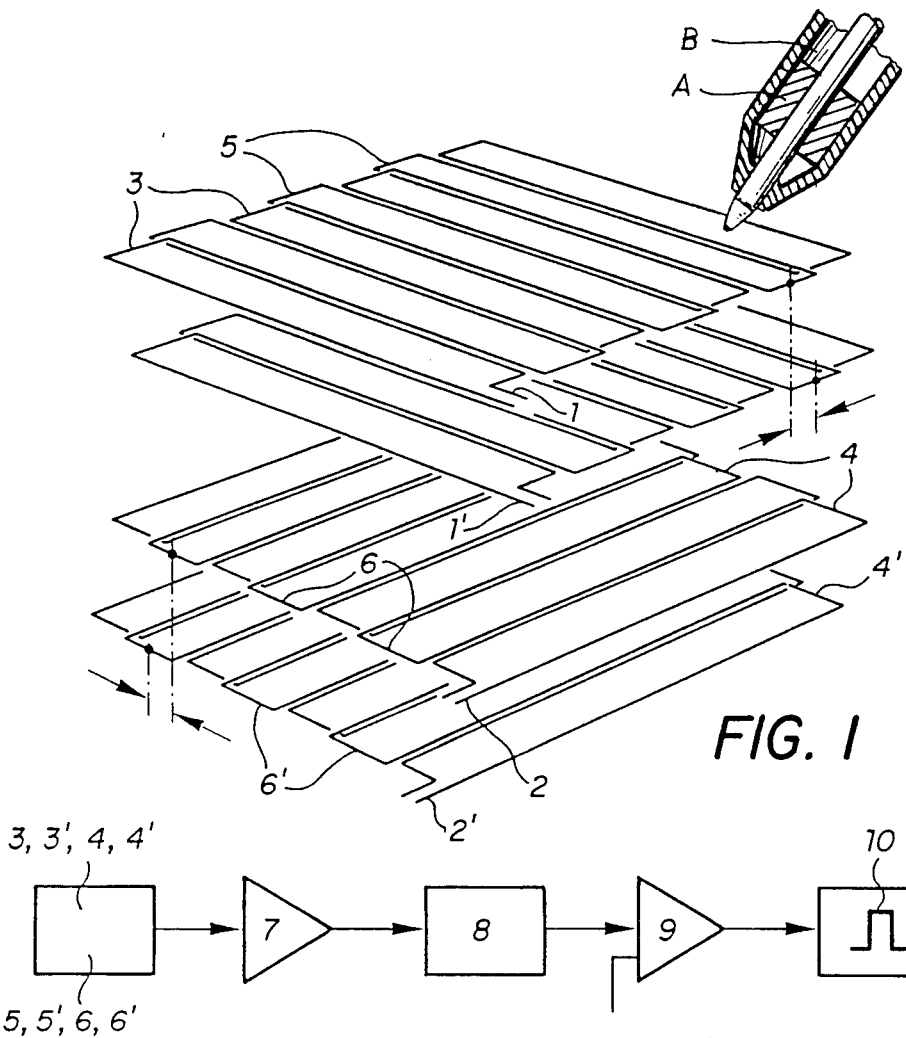
FIG. 1
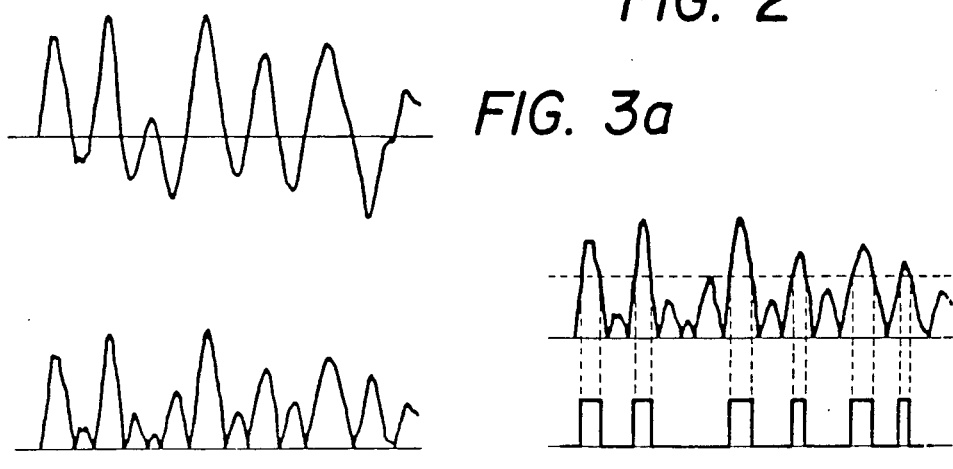
FIG. 2
FIG. 3a
FIG. 3b
FIG. 3c

DEVICE FOR DETECTING THE DISPLACEMENT OF A WRITING IMPLEMENT

The present invention relates to a device for detecting the displacement of a writing implement from a proximity threshold which is determined relative to a writing surface, the instrument having, close to its writing tip, a permanent magnet the magnetisation of which is orientated so as to be generally parallel to the longitudinal axis of the said instrument and symmetrical about this axis, the device comprising, subjacent to the writing surface, at least two electric conductors in series extending parallel to the writing plane.

French Pat. No. 2 486 271 has already disclosed a device for measuring the characteristic parameters of the speed of handwriting using coils disposed beneath the writing surface in which coils electric voltages are induced by the magnetic field of a permanent magnet rigid with the writing implement. If consideration is given to this concept, it will be seen that voltages are induced at the terminals of the coils not only when one is writing, but also consequent upon movements of the writing implement some distance from the writing surface.

It has been proposed inter alia to use a device of this type to compare the speed signals of a signature with those of a reference signature. In a case where this is used, where the comparison is carried out automatically by comparing digitised signals, the signals which derive from movements of the writing implement preceding the signature are parasitic signals which must be eliminated. The distinction between parasitic signals and useful signals presents an awkward problem, the accuracy of which will to a large extent ensure successful comparison of signals.

European Pat. No. 0 030 224 discloses a solution to this problem by associating a piezo-electric detector with the writing surface, in order to set the start of the comparison at the moment the writing implement touches the writing surface. In practice, it has been shown that this system is frequently subject to malfunctioning in that it is sensitive to parasitic noise.

The aim of the invention is to obviate, at least in part, the disadvantages set out above.

To this end, the subject of the invention is a device for detecting the displacement of a writing implement according to claim 1.

The advantage of this device over other solutions previously proposed lies essentially in that only the magnetic field emanating from the permanent magnet rigid with the writing implement can induce a characteristic signal of the fixed proximity threshold. Consequently, false starts to the signature comparison process for example, caused by a variety of parasitic vibrations transmitted to the writing surface, are avoided. As a result, no other special precautions are necessary for determining the start of recording in order to proceed with the comparison of a signature with a reference signature. This feature is of great importance in a system intended for use by the general public, as would be the case if this method of comparing signatures were to be used for credit cards in order to verify that the holder of a given card is in fact the legal cardholder.

The accompanying drawings show diagrammatically and by way of example an embodiment of the device which is the subject of the present invention.

FIG. 1 is an exploded perspective view of this embodiment.

FIG. 2 is an electronic circuit diagram.

FIGS. 3a to 3c are diagrams of the processing of the signal by the circuit in FIG. 2.

FIG. 1 shows four electric conductors 1, 2 and 1', 2' each forming a series of rectangular loops 3, respectively 4, 3' or 4', adjacent on their long sides and open on the short side, the opening of the adjacent loops being located at the respective opposite ends of these loops. Having formed the loops 3, 4 respectively, the conductors 1 and 2 form a second series of rectangular loops 5, and 6 respectively, which are adjacent on their long sides, and open on their short sides, the openings of the adjacent loops being located at the respective opposite ends of these loops. The loops 5 or 6 respectively overlap the loops 3 and 4 respectively, but with their open ends adjacent the respective closed sides of the loops 3 and 4 respectively. The conductors 1', 2' likewise form loops 5' or 6' respectively which are arranged identically in respect of the loops 3' and 4' in the same way as the loops 5 and 6 in respect of the loops 3 and 4.

In this example, the width of the loops 3 to 6 and 3' to 6' is 1 cm, magnet A secured to shaft B of the writing implement is comprised of a cylinder made of samarium cobalt 7 mm in diameter by 10 mm in length, and of which the end closest the tip of the writing implement is set 5 mm back therefrom. With a magnet of this type, when the tip of the writing implement is 5 mm from the writing surface, i.e. when the end of the the magnet closest this surface is 1 cm away, the diameter of the magnetic flux cutting the writing surface is 1 cm.

Since the maximum flux variation in a loop, generating a maximum e.m.f., occurs when the longitudinal axis of the magnet coincides with that of the writing implement, and is displaced perpendicular to one of the longitudinal windings of a loop, and the width of a loop is substantially equal to that of the flux occurring when the tip of the writing implement is 5 mm from the writing surface, the writing instrument has to move substantially parallel to this surface, with movement components transverse to the loops 3, 3' and 5, 5' and 4, 4' and 6, 6' respectively of at least 1 cm to induce the maximum e.m.f. To reduce this displacement length to 5 mm between two maximum e.m.f. and increase the sensitivity of the device, the two conductors 1 and 1' and the two conductors 2 and 2' connected in series are superimposed, being staggered by a half a pitch, so that the displacement of the writing implement generates a maximum e.m.f. as soon as it is displaced with a movement component transverse to the loops of the conductors 1 and 1' or 2 and 2' by at least 5 mm lengthwise and at most 5 mm from this surface.

The major axes of the rectangular loops 3, 3'0 and 5, 5' cut the major axes of the loops 4, 4' and 6, 6' at right angles. This arrangement means that the four superimposed conductors detect the movement components along two rectangular axes.

The electronic diagram of the processing of signals derived from the coils 3 to 6 and 3' to 6' comprises a signal amplifier 7, a rectifier 8 and FIG. 3c shows the setting of the threshold and the generation of control pulses each time the detected, amplified and rectified signal exceeds the fixed threshold.

The proposed solution is extremely simple, as the conductors 1, 2 and 1', 2' can be made using printed circuit technology. This solution is reliable in that the control pulse can only be generated by the writing implement associated with a permanent magnet being displaced at a set distance from the writing surface. Furthermore, this solution is fully compatible with the process of detecting the speed of the writing implement by inducing voltages proportional to this speed at the terminals of the induction coils, as described in the above-mentioned documents.

I claim:

1. A device for detecting the displacement of a writing implement from a proximity threshold determined relative to a writing surface, this instrument having close to its writing tip a permanent magnet of which the magnetisation is orientated so as to be generally parallel to the longitudinal axis of the said instrument and symmetrically about this axis, the device comprising, subjacent to the writing surface, at least two electric conductors in series extending parallel to the writing plane, characterised in that each of the conductors forms a series of extended parallel loops open alternately at their opposite ends, the major axes of the loops of one conductor being perpendicular to the major axes of the loops of the other conductor, the width of the loops being selected so as to be substantially equal to the diameter of the flux of the said permanent magnet when the said writing implement is, at the most, a given distance from the said writing surface, so that the displacement of this instrument induces at the terminals of these conductors periodic voltage variations which are greater than a given threshold, a detector of the said threshold being designed to emit a command signal as soon as the periodic voltage exceeds this threshold.

2. A device accoding to claim 1, characterised in that each conductor forms a second series of extended parallel loops open alternately at their opposite ends and superimposed on the loops of the first series with their respective open ends superimposed on the closed sides of the loops of the first series.

3. A device according to claim 1, characteriesed in that another electric conductor formed in an identical manner to the first conductors is superimposed on each of the two first conductors with their loops extended parallel respectively to those of each of the said first conductors, but staggered by half a pitch of the loop width relative to the first respective conductors.

* * * * *